(12) United States Patent
Kasner et al.

(10) Patent No.: US 9,420,768 B2
(45) Date of Patent: Aug. 23, 2016

(54) AQUAPONICS SYSTEM AND METHODS OF USE

(71) Applicant: Aqualibrium LLC, New York, NY (US)

(72) Inventors: Jared Kasner, New York, NY (US); Josh Rittenberg, New York, NY (US); Guy Tevel, Givataim (IL)

(73) Assignee: AQUALIBRIUM LLC, New York, NY (US)

( * ) Notice: Subject to any disclaimer, the term of this patent is extended or adjusted under 35 U.S.C. 154(b) by 57 days.

(21) Appl. No.: 14/221,933

(22) Filed: Mar. 21, 2014

(65) Prior Publication Data

US 2015/0264899 A1    Sep. 24, 2015

(51) Int. Cl.
| A01K 63/00 | (2006.01) |
| A01K 63/04 | (2006.01) |
| A01K 63/06 | (2006.01) |
| A01G 31/00 | (2006.01) |

(52) U.S. Cl.
CPC ............ *A01K 63/045* (2013.01); *A01K 63/003* (2013.01); *A01K 63/06* (2013.01); *A01G 31/00* (2013.01); *Y02P 60/216* (2015.11)

(58) Field of Classification Search
CPC ............ A01G 27/001; A01G 27/005; A01G 27/003; A01G 31/00; A01G 31/02; A01G 31/06; A01G 9/022; A01G 9/023; A01K 63/003; A01K 63/06; A01K 63/04
USPC .. 47/62 R, 62 A, 62 N, 63, 79, 82, 83, 48.5, 47/59 R, 60, 65.5, 66.1, 66.6, 66.7; 119/245, 246, 247, 248
See application file for complete search history.

(56) References Cited

U.S. PATENT DOCUMENTS

| 2,306,027 | A | * | 12/1942 | Swaney | A01K 63/003 119/246 |
| 3,841,023 | A | * | 10/1974 | Carlyon, Jr. | A01G 9/023 239/20 |
| 4,026,243 | A | * | 5/1977 | Jessop, III | A01K 63/003 119/246 |
| 4,033,072 | A | * | 7/1977 | Kobayashi | A01G 31/06 47/62 R |
| 4,986,027 | A | * | 1/1991 | Harvey | A01G 9/026 47/59 R |
| 5,031,359 | A | * | 7/1991 | Moffett, Jr. | A01G 9/022 47/82 |
| 5,127,366 | A | * | 7/1992 | Kim | A01G 31/02 119/246 |
| 5,363,594 | A | * | 11/1994 | Davis | A01G 9/022 47/82 |

(Continued)

OTHER PUBLICATIONS

PCT Search Report, Application No. PCT/IB2015/000729, date of mailing Nov. 24, 2015.

*Primary Examiner* — Trinh Nguyen
(74) *Attorney, Agent, or Firm* — Kramer Levin Naftalis & Frankel LLP (57) ABSTRACT

An aquaponics system comprises an aquarium module configured to hold a water, a garden module that sits above the aquarium, a contiguous growth media bed within the garden module configured to physically support the growth of plants, a pump and piping for drawing water from the aquarium module to the garden module, a siphon tube for reoxygenating and delivering water from the garden module back to the aquarium module, and a light source Molded bodies form the base (bottom) and dome (top) of each module, and are connected at the corners by connectors that slidably fit into hollow stabilizing pillars, which permit internal passage of wires, cables and piping on the interior of the system, creating an easily assembled, modular, aesthetically pleasing and energy efficient way to house fish and grow plants.

9 Claims, 8 Drawing Sheets

(56) References Cited

U.S. PATENT DOCUMENTS

| | | | |
|---|---|---|---|
| 5,385,590 A * | 1/1995 | Sledge | A01G 31/02 47/62 R |
| 5,440,836 A * | 8/1995 | Lee | A01G 31/06 47/59 R |
| 5,555,676 A * | 9/1996 | Lund | A01G 9/022 47/82 |
| 5,724,768 A * | 3/1998 | Ammann, Jr. | A01G 31/02 47/59 R |
| 5,826,375 A | 10/1998 | Black | |
| 6,477,805 B2 * | 11/2002 | Ware | A01G 9/023 47/83 |
| 7,055,282 B2 * | 6/2006 | Bryan, III | A01G 31/06 47/62 R |
| 7,861,459 B2 | 1/2011 | Brooke et al. | |
| 8,176,875 B1 | 5/2012 | Alshammary et al. | |
| 8,181,391 B1 | 5/2012 | Giacomantonio | |
| 8,291,640 B2 | 10/2012 | Kloas et al. | |
| 8,484,890 B2 * | 7/2013 | Simmons | A01G 31/02 47/62 A |
| 8,578,651 B1 | 11/2013 | Giacomantonio | |
| 8,966,816 B2 * | 3/2015 | Toone | A01G 31/02 119/246 |
| 2007/0144069 A1 * | 6/2007 | Gottlieb | A01G 9/023 47/82 |
| 2009/0206082 A1 | 8/2009 | Vovan | |
| 2011/0120005 A1 | 5/2011 | King et al. | |
| 2012/0090235 A1 | 4/2012 | Horn et al. | |
| 2013/0047508 A1 | 2/2013 | Toone et al. | |
| 2014/0223819 A1 * | 8/2014 | Coghlan | A01K 63/045 47/62 R |
| 2015/0289459 A1 * | 10/2015 | Tsai | A01G 27/001 47/79 |

\* cited by examiner

AQUAPONICS SYSTEM AND METHODS OF USE

BACKGROUND OF THE INVENTION

The present invention is in the technical field of agriculture. More particularly, the present invention is in the technical fields of aquaponics, a combination of aquaculture and hydroponics in a symbiotic environment. Aquaponic systems use the ammonia rich waste supplied by fish as fertilizer by using pumps to deposit it into grow beds for plants. Plants and natural organisms in the grow beds convert the ammonia rich waste from the fish into nitrites then nitrates, which the plants use as fertilizer. The plant roots also help filter other substances from the water. Water from the grow beds is returned to the fish tank. The water filtered by the grow beds also contains other nutrients beneficial for the fish.

The ability to sustain vegetation in small areas, such as urban backyards and even indoors, has great appeal to those that lack the space but have the desire to grow their own flowers and vegetables without a great deal of maintenance. Various systems are described for vertical and modular farming, aquaponics and hydroponics, such as described in U.S. Pat. Nos. 8,578,651, 8,181,391, 7,861,459, 5,031,359, and 5,826,375. However, these systems are not enclosed or utilize multiple reservoirs for plant growth, thus limiting the amount of plant growth the system can sustain and locational versatility: they may not be desirable for indoor settings.

The commercially available "Aquafarm", available for online and in-store purchases at commercial establishments such as Petco and Nordstrom, is small, incorporates segregated "pots" for growing plants, and the tube that is used for the air pump is exposed to the fish.

The aquaponic system described in U.S. Pat. No. 8,291,640 uses a mechanical filter to absorb suspended particles from the water from the aquaculture unit, and a cold trap that is used to condense and collect water from the air in the hydroponic unit (planting bed). Drawbacks of this type of system are the complexity of the mechanics of it, and it is not aesthetically pleasing.

Similarly, the aquaponics system described in U.S. Pat. No. 8,176,875 is complex, utilizing separate fish-rearing tanks, sedimentation tanks and netting tanks for removing solids from the water from the fish tanks, and a degasifier, for removing volatile organic compounds from the water, and also requiring the addition of chemicals to maintain adequate system pH values.

U.S. Patent Publication No. 20130047508 describes yet another aquaponic system which uses individual "containers" for the plants, but this type of system inhibits the growth potential for the plants as well as the ability to grow a greater variety of plants in one system. Smaller and/or segregated containers do not promote dense planting of multiple varieties of plants and/or flowers and may inhibit the growth of certain types of varietals that require greater root space or are root vegetables. Smaller 'cups' and planting beds that are limited by space without proper flushing of the media may also "choke" the plant roots with the waste from the water that cannot be removed from the growth media.

Thus there is a need in the industry for a highly efficient, low maintenance system and method for plant growth that is enclosed, aesthetically pleasing and also space conscious yet improves both the quantity and variety of sustainable vegetation.

SUMMARY OF THE INVENTION

The invention provides a sturdy, modular, streamlined and aesthetically pleasing aquaponics system that incorporates a contiguous media bed for dense planting, improved area for root growth, siphon pump for water filtration and aeration, and pillars, or channels that carry piping and other cables/wires throughout the system without exposing them to the aquatic fauna in an aquarium module.

According to one embodiment, a vertically oriented aquaponics structure comprises an aquarium module comprising a molded hollow body characterized by top and bottom portions of substantially the same rectangular shape forming four corners, wherein said aquarium module is substantially enclosed when the top and bottom portions are joined, said hollow section of said aquarium module allowing said aquarium module to be filled with water, and a garden module comprising a molded hollow body characterized by top and bottom portions of substantially the same rectangular shape forming four corners, wherein said garden module is substantially enclosed when the top and bottom portions are joined together, said hollow section of said garden module allowing said garden module to be filled with grow media. A pump for distributing water from the aquarium module to the garden module is disposed in the aquarium module, and a siphon is disposed in the garden module for redistributing water back to the aquarium module from the garden module, wherein the top and bottom portion of each of said aquarium and garden modules comprise partially hollow stabilizing pillars at each corner of each said top and bottom portion allowing the top and bottom portions of each module to be joined by a corner connector that fits snugly in the stabilizing pillars at each corner of each portion.

The garden and/or aquarium modules may optionally include windows in one or more of the sides of each module, to provide access to the interior of each module without having to disassemble the module. The modules may also optionally include lights, a control panel and other features enabling control of one or more aspects of the system. The height of each module may be in the range of 1 to 5 feet. The width and length may be the same dimension, and may be in the range of 0.5 to 3 feet. According to one embodiment, a system comprising a garden module and an aquarium module is approximately 3 feet high, with a width and length of approximately 2 feet.

According to one embodiment, the aquaponics system comprises an aquarium module configured to hold a water, a garden module that sits above the aquarium, a contiguous growth media bed within the garden module configured to physically support the growth of plants, a pump and piping for drawing water from the aquarium module to the garden module, a siphon for extracting, reoxygenating and delivering water from the garden module back to the aquarium module, and a light source. Each module may comprise two portions, a base, a dome, and each base and dome may include connectors, wherein said base and dome are substantially rectangular and similar in shape and size, each with four corners, and wherein the base and dome comprise partially hollow stabilizing pillars at each corner for receiving a connector allowing the base and dome to be slideably connected at each corner to create an enclosed compartment. The stabilizing pillars are open on both ends to permit running of wires, cables, and piping through the interior of the system from the exterior of the system, and between modules. One or both of the modules may include one or more windows on its sides, providing visual and physical access to the interior of the module.

A vertically oriented aquaponics structure comprises an aquarium module comprising a molded hollow body characterized by top and bottom portions of substantially the same rectangular shape forming four corners, wherein said aquarium module is substantially enclosed when the top and bottom portions are joined, said hollow section of said aquarium module being capable of accepting and housing water, a garden module comprising a molded hollow body characterized by top and bottom portions of substantially the same rectangular shape forming four corners, wherein said garden module is substantially enclosed when the top and bottom portions are joined together, said hollow section of said garden module being capable of accepting and housing grow media, wherein the top and bottom portion of each of said aquarium and garden modules comprise partially hollow stabilizing pillars at each corner of each said top and bottom portion allowing the top and bottom portions of each module to be joined by a corner connector that fits snugly in the stabilizing pillars at each corner of both the top and bottom portions, the corner connectors being sized to fit snugly in the stabilizing pillars at each corner of both the top and bottom portions, a pump for distributing water from the aquarium module to the garden module, and a siphon for distributing water to the aquarium module from the garden module. The connectors include an opening sized and positioned within the connector so as to allow passage of at least one wire, at least one pipe, and at least one cable through the at least one connector and stabilizing pillars. The stabilizing pillars are open on both ends to allow access to the interior of the system for outside wires and cables, but which are still protected from direct exposure to water or grow media in the system, as a result of the design of the pillars.

Operably, the contiguous growth bed comprises a media capable of supporting plant growth, wherein the bed is substantially free of any separations or containers that would otherwise separate or segregate plant growth in the bed.

An energy-efficient method of growing plants in a vertically oriented modular aquaponics system is provided, wherein nutrient-rich water is pumped from an aquarium containing aquatic fauna to a plant bed, wherein plants in the plant bed remove nutrients from the water, and returning water to the aquarium by siphoning the water from the plant bed, wherein a siphon is activated when the water in the plant bed reaches the height of a siphon tube operably disposed in the plant bed, and wherein said siphoning the water reoxygenates the water that is returned to the aquarium. Siphoning the water requires no energy source, and the siphon is activated only when needed, to remove water from the garden module and reoxygenate it, as gravity operates to remove the water through a system of return piping to the aquarium module. The piping is contained in functional pillars that provide structural support to the overall system, as well as protect the piping and other cables/wires required for the system.

DETAILED DESCRIPTION OF THE INVENTION

Figure 1:
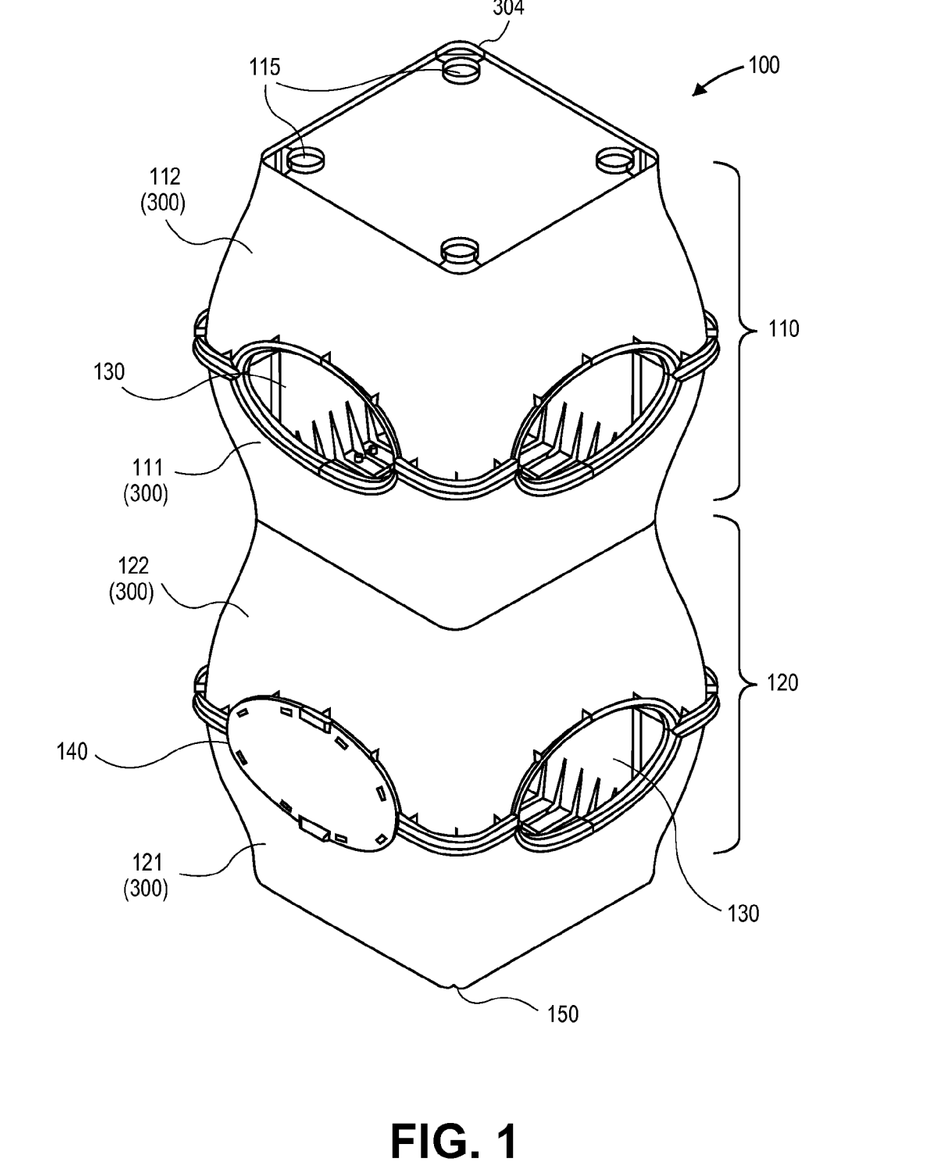
FIG. 1 is a perspective view of one embodiment of the aquaponics system showing an empty garden module stacked on top of an empty aquarium module, the two modules of the system joined by interlocking couplers.
Figure 2:
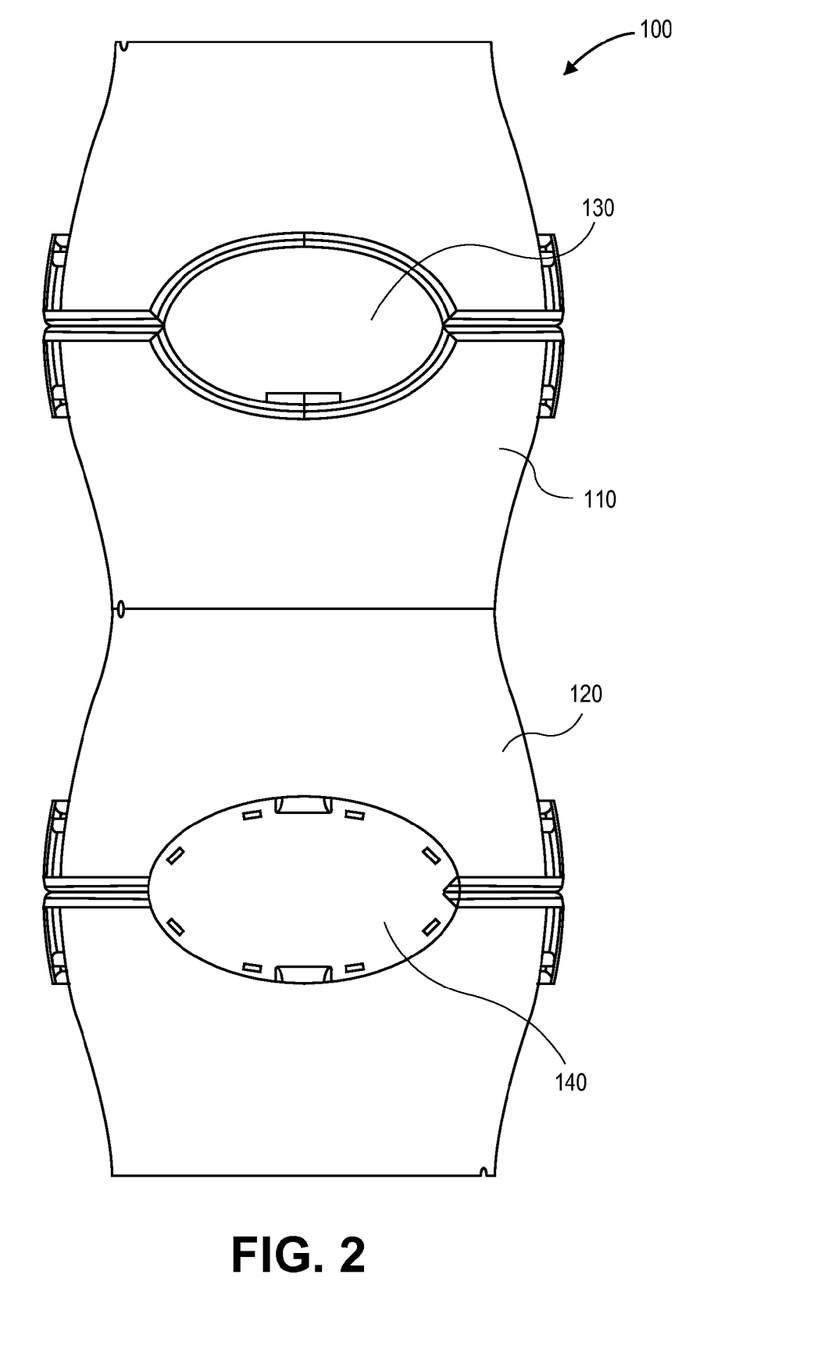
FIG. 2 provides a side view of the aquaponics system, further illustrating a protective cover on a window in the aquarium module.

FIG. 1 illustrates one embodiment of the aquaponics system 100. The vertically oriented system 100 comprises two molded hollow body structures, or modules: a garden 110, also called a "garden module," stacked on top of an aquarium 120, also called an "aquarium module". Each module 110 and 120 is substantially rectangular in shape, with four "corners" which may be rounded for aesthetic appeal. FIG. 2 is a side view of an embodiment of the system 100.

In operation, the hollow nature of each module permits filling the garden module 110 with growth media for growing flowers, vegetables, herbs and other plants, and filling the aquarium module 120 with water and aquatic flora and fauna.

Figure 3A:
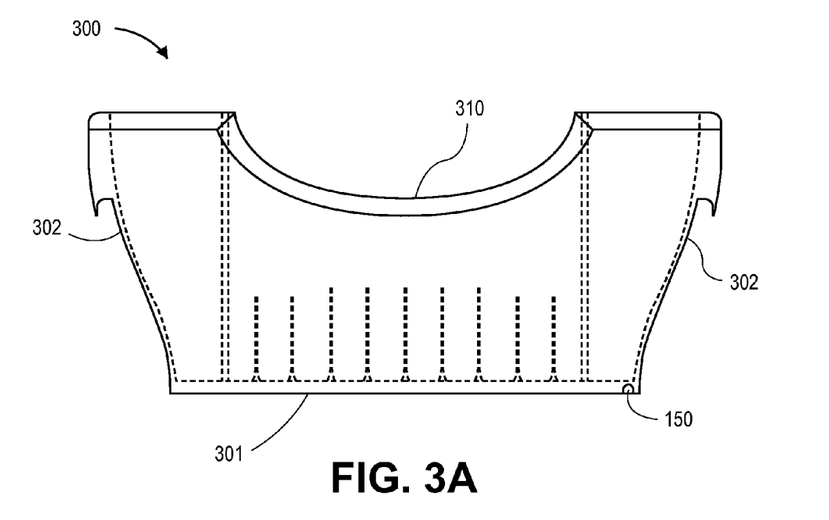
FIGS. 3A and 3B provide side views of a vase in accordance with an embodiment of the invention.
Figure 3B:
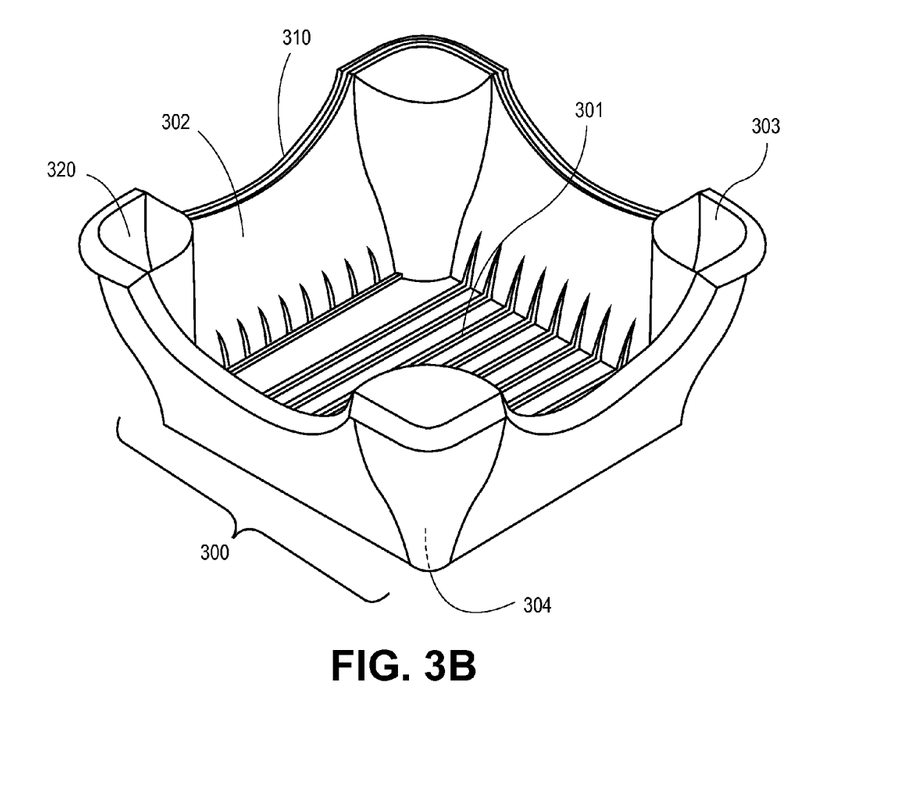

A single vase 300, as shown in FIGS. 3A and 3B, is the main structural component of the system and forms the bottom and top halves, called "bases" and "domes", respectively, of each module 110 and 120.

Referring back to FIG. 1, as illustrated, a first vase 300 is an aquarium base 121 that forms a container for holding water and other aquatic materials (e.g., gravel or food media) for physically supporting fish and other aquatic fauna and flora. The aquarium environment can be fresh or salt water and the vegetation grown in the garden module 110 accordingly corresponding to the aquarium environment. A second vase 300 forms an aquarium dome 122 that is provided to enclose an upper portion of the aquarium module 120, as well as provide a support for the garden module 110. A third vase 300 forms a garden base 111 that is used to house, contain, and physically support and contain a contiguous growth media (not shown in, which makes up the planting bed for vegetables and/or flowers. A fourth vase 300 forms a garden dome 112 that is used to enclose an upper portion of the garden module 110, and protect the plant growth and growth media. Each vase is equipped with interlocking couplers 115 provided at each corner of the flat side of the vase that permit the joining of two modules and prevent, in accordance with one embodiment, the garden module 110 from slipping off of the aquarium module 120 when they are stacked. According to one embodiment, a second system may be stacked on top of a first system, also using the interlocking capability of the interlocking couplers 115. A small port 150 is provided at the corner of each vase which provides access to the interior of the system for wires, cables, etc.

As shown in FIG. 3A, according to one embodiment of the invention, a vase 300 may include a side indentation or notch 310. When two vases 300 are joined to create an enclosed aquarium module 120 or an enclosed garden module 110 (see FIG. 1 or 2), two notches 310 (one on each vase 300) may align to form an opening or window 130 (illustrated in FIGS. 1 and 2) that provides an aesthetically pleasing view of the aquatic flora and fauna contained within the aquarium module 120, and the plants in the garden module 110, and allows air to freely flow through each module of the system 100. Additionally, opening or window 130 may allow for the venting of gases generated by organisms growing in garden module 110 and/or aquarium module 120. The windows 130 and corresponding protective covers 140 may be any geometric shape or size.

According to another embodiment, the aquarium 120 and/or garden modules 110 may include fewer than four windows 130. Alternatively, only one of the two vases 300 joined to create aquarium 120 and/or garden modules 110 may be notched to form a window 130 when the module is assembled.

The one or more windows 130 may allow for accessories (not shown) to be attached to, or used with, the system 100, such as an apparatus to remove the water from the aquarium module 120 (e.g. a water vacuum) so that the water can be replaced, a dispenser of nutrients for the aquarium module 120 and/or garden module 110, a water filter, a water supply etc. In other embodiments, a protective cover 140 may be used to cover one or more windows 130 to, for example, protect the aquatic and/or flora environments inside the system 100 and prevent small children and pets from access to the inside of the system 100. The protective cover 140 may be removable or permanent. FIGS. 1 and 2 illustrate the use of a protective cover 140 on one window 130 of an aquarium module 120.

Referring to FIGS. 3A and 3B, each vase 300 is substantially square in shape, comprising a base 301 and four sides 302. According to one embodiment, the vases are manufactured in two pieces, the base 301 as one piece and the four sides 302 together as another piece. When the vases are manufactured in two pieces, the base and sides are operably connected by fitted corners, and may be locked or latched closed. The two-piece construction enables the removal of the base for maintenance or to retrofit the vase with additional features such as a control panel, lights, or other desired attachments.

Figure 4A:
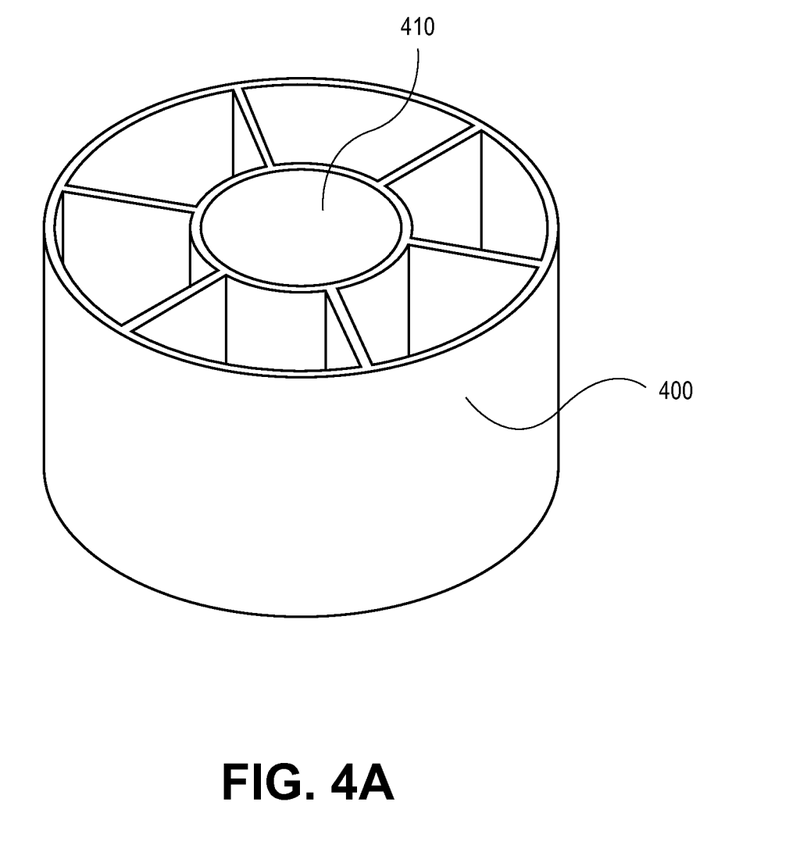
FIG. 4A illustrates a stabilizing connector.
Figure 4B:
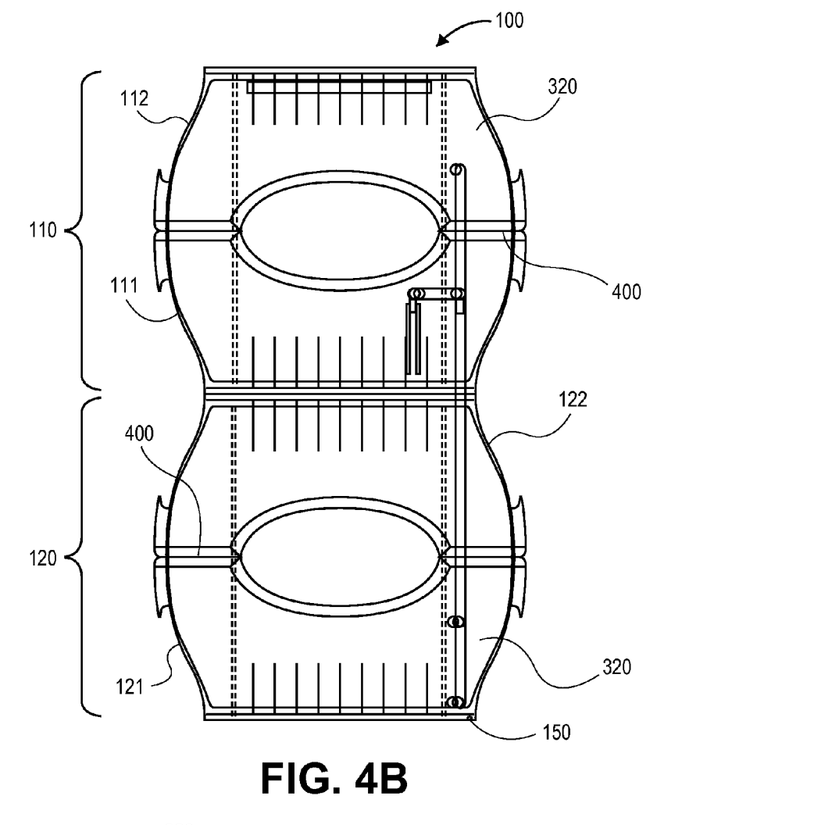
FIG. 4B illustrates one embodiment of the system with the stabilizing connector fitting into stabilizing pillars and connecting two vases of each module.
Figure 4C:
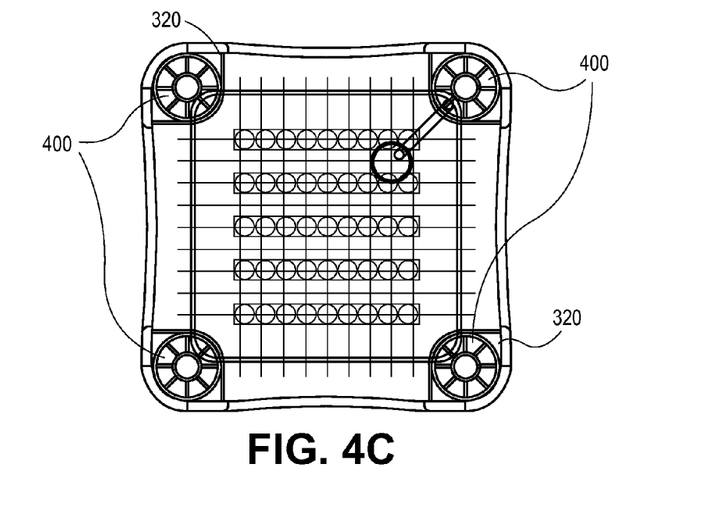
FIG. 4C provides a top-down view of one top vase of a module, illustrating how the stabilizing connectors fit snugly into the stabilizing pillars to join two vases to join the top and bottom of a module.

The vases 300 of the garden module 110 and aquarium module 120 comprise partially hollow stabilizing pillars 320 at each corner, as shown in FIG. 3B. Each pillar 320 has a wide opening 303 at one end for receiving a stabilizing connector (not illustrated in FIG. 3B) and a narrow opening 304 at the other end which enables the running of cables and wires through each vase and each module. In some embodiments, stabilizing pillars 320 may be sized so as to accept insertion of a stabilizing connector 400, which is illustrated in FIGS. 4A, 4B and 4C. The narrow openings 304 are also illustrated in FIG. 1, shown on the top of garden module 110/dome 112.

FIG. 4A illustrates a stabilizing connector 400 which is used at each corner of a vase, to snugly and slideably fit in the partially hollow stabilizing pillars 320 at each corner (shown in FIGS. 4B and 4C), allowing the bases 111 and 121 and domes 112 and 122 of each module 110 and 120 to be stably connected to one another. Stabilizing connectors are sized to fit into the stabilizing pillars at the corner of the top and bottom of each module (each vase). The stabilizing pillars 320 and stabilizing connectors (also called "corner connectors") 400 provide not only seamless connection of base 111/121 and dome 112/122 without additional hardware on the inside or outside of each module 110/120, but also provide additional structural support to the overall system 100.

When assembled, as a single module 110 or 120 (base 111/121 and dome 112/122 connected) or the entire system 100 (fully assembled aquarium module 110 and garden module 120), the stabilizing pillars 320 and stabilizing connectors 400 create a completely enclosed (with respect to the interior of the system), contiguous design that protects the water or growth media inside the module 110 and/or 120 from the environment external to the system 100.

As shown on FIG. 4A, an opening 410 through the center of a stabilizing connector 400 may enable the passage of cables, wires, and/or piping through a stabilizing connector 400 and an associated stabilizing pillar(s) 320. The cables, wires, and/or piping may enter the opening 410 and/or the stabilizing pillar 320 via a port 150 (shown FIG. 4B). The cables, wires, and/or piping may be connected to a device attached to and/or separate from system 100. Exemplary devices include a power source, a power converter, an aquarium pump, an air source, a water source, and an electrical power outlet. Additionally, or alternatively, the cables, wires, piping, device and/or accessory may be totally, or partially, housed within opening 410 and/or stabilizing pillar(s) 320. On some occasions, stabilizing connector 400 and/or associated stabilizing pillar(s) 320 may act to protect the cables, wires, piping, device and/or accessory running through the system 100 from, for example, plant matter (e.g., roots), growth media, water, and/or chemicals housed in aquarium module 110 and/or garden module 120 and provide a smooth, streamlined design.

Figure 5:
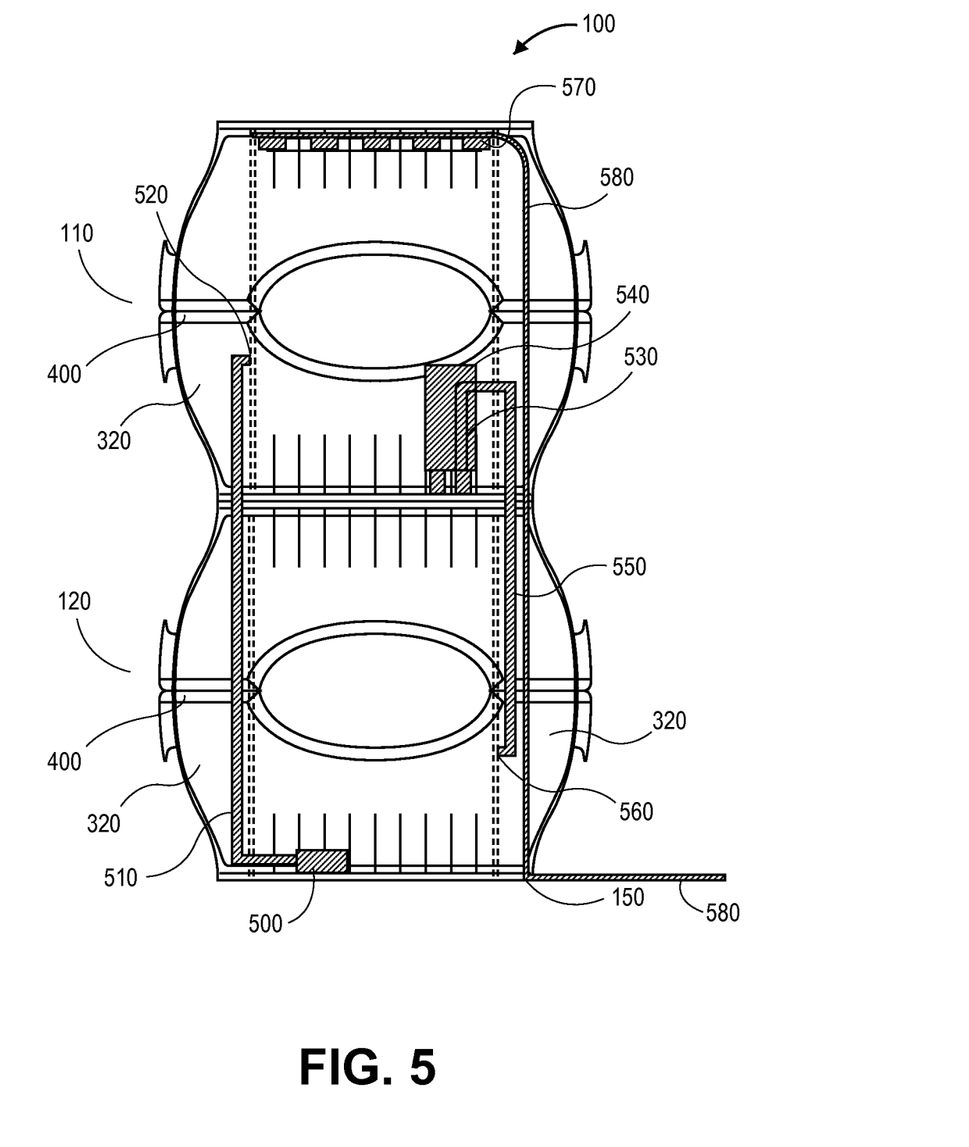
FIG. 5 provides a side view of the interior of the system 100, illustrating exemplary internal piping.

FIG. 5 provides a side view of the interior of the system 100, illustrating the internal piping that is used to transfer water from the aquarium module to the garden module, and vice versa. A submersible pump 500 is provided in the aquarium module 120 that pumps water through a transfer pipe 510 from the aquarium module 120 up into the garden module 110. In one embodiment, the transfer pipe 510 extends from the pump 500 through a stabilizing pillar 320 and associated corner connector 400 and into the garden module 110. Water is distributed from the transfer pipe 510 into the grow bed (not shown) in the garden module 110 via a port 520 in the side of the stabilizing pillar 320.

Water returns from the garden module 110 to the aquarium module 120 via a siphon. According to one embodiment, siphon is a bell siphon. A siphon tube 530 is disposed in the garden module 110, and related piping is described herein. The opening of the siphon tube 530 is situated below the surface of the grow bed during operation of the system (i.e. when the garden module is filled with growth media). A center channel 540 is situated in the garden module 110 to protect the siphon tube 530 from being damaged or clogged by media, plant growth, roots, etc. during operation of the system. The siphon tube 530 fits through an opening in the side of the center channel 540. When the siphon is activated, water is siphoned from the garden module 110 through the return water pipe 550 and into the aquarium module 120 through a port 560 in a stabilizing pillar 320 in the base of the aquarium module 120. The piping configuration shown in FIG. 5 is only one possible configuration of piping contemplated in accordance with the invention. The specific distribution pipes and/or locations of their placement in the system 100 may be adjusted depending on, for example, functional and/or aesthetic considerations.

In one embodiment, lights 570 are provided in the garden module 110 as shown in FIG. 5. One or more lights, or a series of lights, may be used. Lights 570 may be connected to the top of the garden module 110, mounted on one or more sides of the garden module 110, or mounted on the bottom of the garden module 110. Any type of lighting suitable for growing plants may be provided. According to one embodiment the lights are a series of LED lights. The lights may be wired with power cable 580 (exiting the bottom of the system 100 via port 150), battery powered, and/or solar powered.

The aquaponics system 100 may include a wired or wireless control panel, which may be operated directly or by remote control. The control panel may control physical operational features of the system such as turning the lights on and off, adjusting the intensity of the lights, operating the water pump, operating a camera, etc.

The control panel can be located anywhere inside or outside the system. According to an embodiment, the control panel is attached to the inside of one or both of the aquarium 122 and/or garden 112 domes. The control panel may contain a free access chip that can be Wi-Fi compatible, Bluetooth compatible, and/or otherwise wirelessly connect to other computer and wireless applications. The control panel may also be fitted with or be connected to one or more sensors for controlling the interior environment of the system. One or more sensors may be used tsense and control the grow medium pH, water temperature, water level, etc.

Now describing the operation of the siphon, once the level of water in the garden module 110 reaches the level of the opening of the siphon tube 530, gravity activates the siphon and the water is pulled down through the siphon tube 530 into the aquarium module 120. According to the embodiment depicted in FIG. 5, because the opening of the siphon tube 530 is protected by the center channel 540, water travels up through the center channel 540, and into the siphon tube 530, and as the water starts to flow out through the siphon tube 530, the siphon is activated and water in the garden module is pulled down through the grow bed and up into the center channel 540 and out through the siphon tube 530 to the aquarium module 120.

According to one embodiment, the siphon tube 530 operates continuously so that there is a continuous distribution of nutrient rich water to the media, and a continuous pull of cleaned, nutrient-free water through the media and into the siphon tube for removal back to the aquarium module. The opening of the siphon tube 530 can be placed anywhere within the media bed, provided its opening is beneath the surface of the media bed. Otherwise, water may collect on the surface of the media which may be detrimental to the plant growth. According to the embodiment shown in FIG. 5, the center channel 540 and siphon tube 530 are off-center with respect to the garden module 110. The siphon tube carries the nutrient-free water to the aquarium module.

Figure 6A:
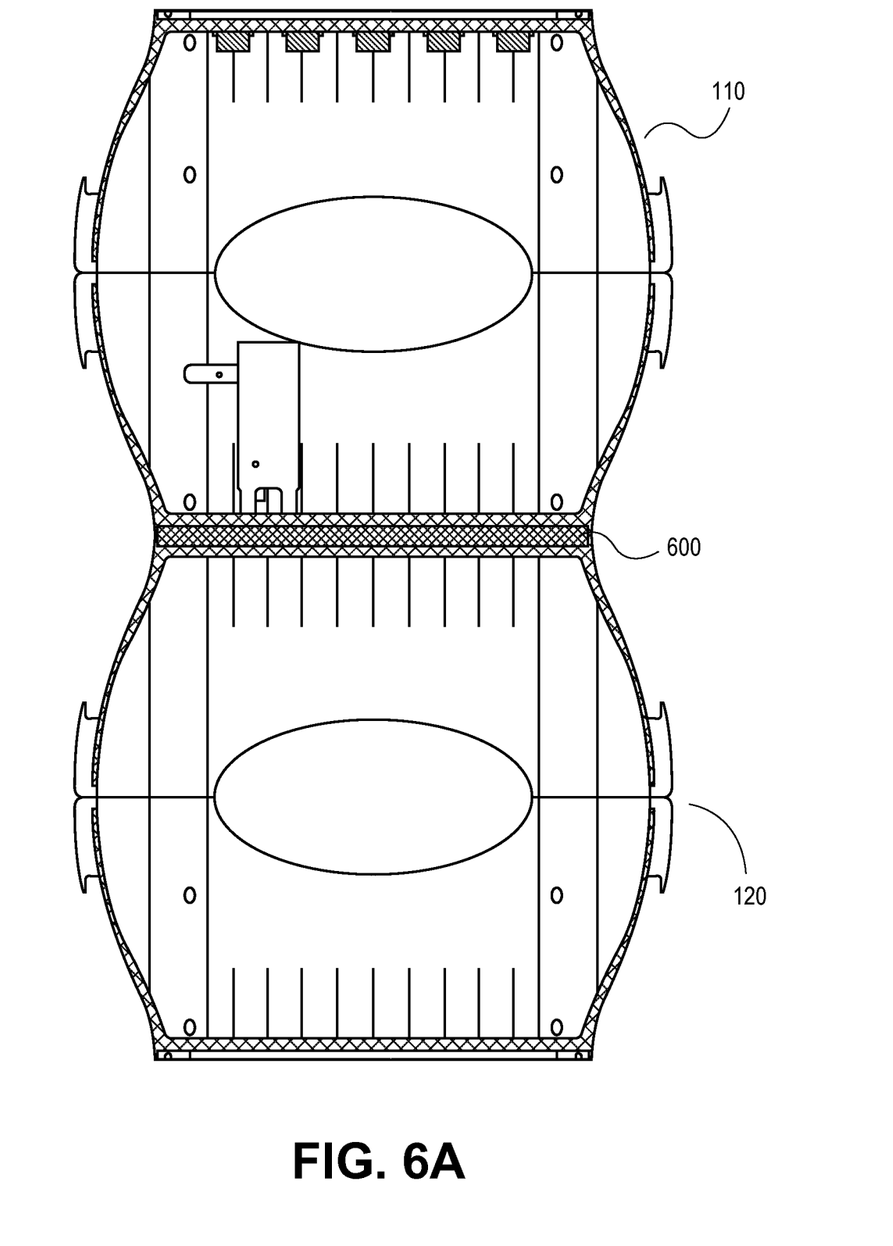
FIG. 6A shows a side view of an exemplary center grid connector.
Figure 6B:
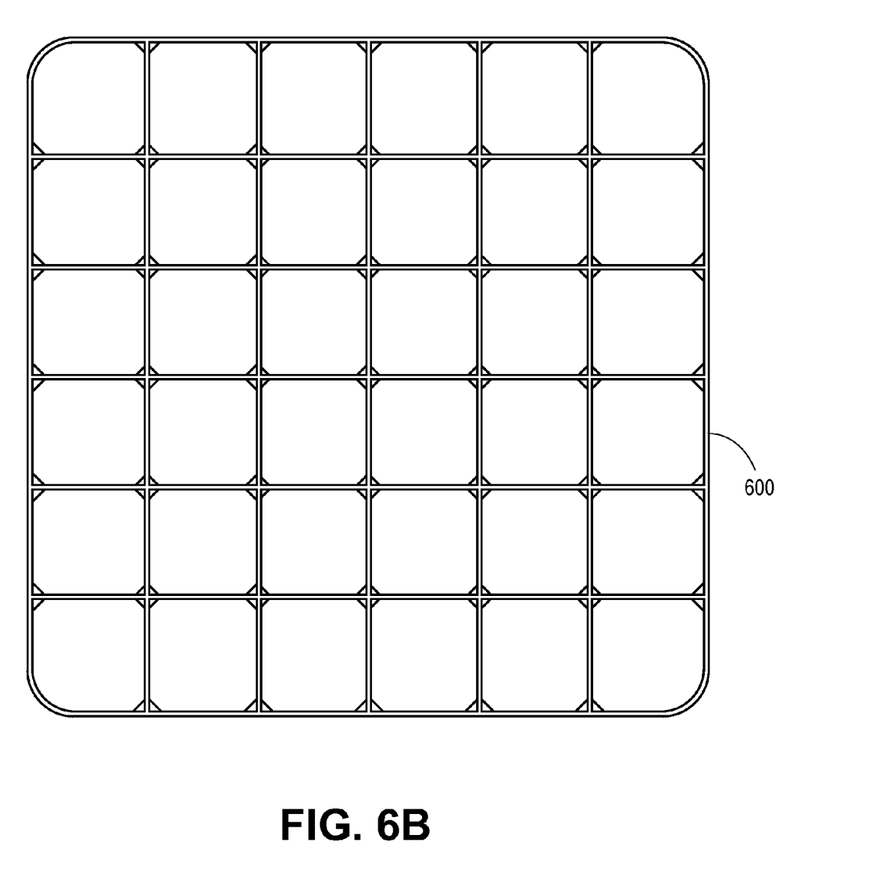
FIG. 6B shows a top view of the exemplary center grid connector.

FIGS. 6A and 6B illustrate a center grid connector 600, which may be incorporated between the aquarium module 120 and garden module 110 to connect the two modules and provide added stability to the overall system 100. The center grid connector 600 may be configured as one piece, or may be provided in multiple pieces that interlock together. Alternatively, the center grid connector 600 may be a small support piece disposed only at each corner of the system. Alternatively, no center grid connector 600 is required and the system is joined by interlocking couplers 115 shown on FIG. 1.

A strong, shape-retaining material is used to form the vases of the present invention. According to one embodiment, a rigid, temperature resistant and impact resistant material such as certain plastics used in the design of household and other commodity items may be used. A commercial material that also possesses certain optical properties when molded (transparency or semi-transparency) may also be desirable. In one embodiment, acrylic, polycarbonate, or the like is used. Preferably, the vases 300 are formed by machining and/or molding a transparent or semi-transparent plastic or polymeric material such as acrylic or polypropylene that is strong enough to support the weight of water in the aquarium and the weight of the growth media and plant growth in the garden, and to support the stacking of the modules as illustrated in FIGS. 1A and 1B.

According to one embodiment, ABS polycarbonate blend is used to form the vases 300. As illustrated in FIG. 3B, for example, cross-hatching of the machined polycarbonate is employed to add strength and stability to the design of the vases 300.

According to one embodiment of the invention, the aquaponics system is approximately 1 to 3 feet wide, 1 to 3 feet long, and 2 to 4 feet tall. According to another embodiment, it is greater than 3 feet wide, 3 feet long, and 4 feet tall. According to one embodiment, a system 100 comprising a garden module 110 and an aquarium module 120 is approximately 3 feet high, with a width and length of approximately 2 feet each. Each module may be substantially 1 ft×1 ft×1 ft (width×depth×height). Each module 110/120 may be square or rectangular in size. According to an alternative embodiment, each module 110/120 is substantially 1.5 feet wide×1 ft high. The aquarium module 120 may hold 5 to 25 gallons of water. Other ranges of water volume contemplated by the invention include: 1 to 5 gallons, 5 to 10 gallons, 10 to 15 gallons, 15 to 20 gallons, 20 to 25 gallons, 25 to 30 gallons. According to one embodiment, the aquarium module 120 holds more than 30 gallons of water. According to an embodiment, the system 100 fits on a tabletop, countertop, or on the floor in a house, apartment, or school, having dimensions appropriate for an indoor garden, which also acts as a decorative piece in, for example, a kitchen, sun room, den, hallway, etc.

Turning to the garden module, a contiguous growth media sits directly in the base, providing a bed for the growth of plants. The growth media may be any type of media that supports growth of plants and allows establishment of a root structure necessary for plant growth. Examples of suitable growth media include hydroton (commonly known as "Plantit!®"), gravel, perlite, soil, or any combination thereof. Any media which allows root systems to form, extend, and maintain the necessary "grip" on the media to support vegetation can be used in accordance with the system 100. The contiguous nature of the growth media acts as a physical filter for the fish waste in the water. It removes solids from the water before the water is sent back to the aquarium module 120.

The aquaponics system 100 supports the growth of many different types of plants. The system allows for dense planting, which can accommodate a wide variety of plant types and varieties. The system also provides for growth of plants that require greater root space and also root crops, which may not grow in other systems that are partitioned, or limited by space and or have separate "cups" or "dividers" that limit or restrict root space because of limited or restricted size/depth of growth media within the overall system. According to one embodiment, plants such as arugula, peas, radishes, lettuce, chard, dwarf tomatoes, eggplant kale, and similar plants may be grown. Similarly, sprouts may be grown. The system supports the growth of sprouts interspersed within the other varietals selected. The contiguous nature of the bed supports growth of plants that require a greater area for the roots necessary to support the plants. Similarly, the nature of the contiguous media supports growth of root crops such as ginger, turmeric, radishes, beets. According to an embodiment, the contiguous growth media is minimally partitioned to allow for organizing plants without truly separating them, so that plant roots are not restricted or choked.

Companion growth is also an advantage of the continuous nature of the growth media in the present system. Companion growth, or the interaction of root systems between one or more plants, is beneficial for some plants, as they work and feed off of one other, with respect to root structure, nutrient-sharing, etc. Companion planting can promote more vigorous growth and create better, and different, tasting vegetables. Examples of companion planting is growing rosemary next to tomatoes.

It will be understood by those of skill in the art that numerous and various modifications can be made without departing from the spirit of the present invention. Therefore, it should be clearly understood that the forms of the present invention are illustrative only and are not intended to limit the scope of the present invention.

What is claimed:

1. An aquaponics system comprising:
   an aquarium module configured to hold a quantity of water and aquatic life,
   a garden module coupled via interlocking couplers to the top of the aquarium wherein the aquarium module and the garden module each comprise a base, a dome, and connectors, wherein said base and dome are substantially rectangular and similar in shape and size, each with four corners, and wherein the base and dome comprise stabilizing pillars at each corner for receiving a connector allowing the base and dome to be slideably connected at each corner to create an enclosed compartment,
   a contiguous growth media bed housed within the garden module, the contiguous growth media being configured to physically support the growth of plants,
   a pump and piping for drawing water from the aquarium module to the garden module,
   a siphon for extracting water from the garden module and delivering the extracted water to the aquarium module, and
   a light source for providing light to the garden module.

2. The system of claim 1, wherein at least one of the connectors includes an opening sized and positioned within the connector so as to allow passage of at least one of a wire, a pipe, and a cable through the at least one connector and support pillars connected to the connector.

3. The system of claim 1, wherein the garden module comprises one or more windows.

4. The system of claim 1, wherein the contiguous growth bed is substantially free of any separations or containers that would otherwise separate or segregate plant growth in the bed.

5. The system of claim 1, wherein the aquarium module holds at least 5 gallons of water.

6. The system of claim 1, wherein the aquarium module comprises one or more windows.

7. A vertically oriented aquaponics structure comprising:
   an aquarium module comprising a molded hollow body characterized by top and bottom portions of substantially the same rectangular shape forming four corners, wherein said aquarium module is substantially enclosed when the top and bottom portions are joined, said hollow section of said aquarium module being capable of accepting and housing water,
   a garden module comprising a molded hollow body characterized by top and bottom portions of substantially the same rectangular shape forming four corners, wherein said garden module is substantially enclosed when the top and bottom portions are joined together, said hollow section of said garden module being capable of accepting and housing grow media and a light source,
   interlocking couplers disposed on each of the top and bottom portions of the aquarium and garden modules which join the modules,
   wherein the top and bottom portion of each of said aquarium and garden modules comprise stabilizing pillars at each corner of each said top and bottom portions allowing the top and bottom portions of each module to be joined by a corner connector that fits snugly in the stabilizing pillars at each corner of both the top and bottom portions,
   the corner connectors being sized to fit snugly in the stabilizing pillars at each corner of both the top and bottom portions,
   a pump for distributing water from the aquarium module to the garden module,
   a siphon for distributing water to the aquarium module from the garden module; and
   a light source for providing light to the garden module.

8. The vertically oriented aquaponics structure of claim 7, wherein at least one of the connectors includes an opening sized and positioned within the connector so as to allow passage of at least one of a wire, a pipe, and a cable through the at least one connector and stabilizing pillars connected to the connector.

9. The system of claim 1, further comprising a grow medium retained in the contiguous grow bed.

* * * * *